United States Patent [19]

Werner et al.

[11] Patent Number: 5,835,731
[45] Date of Patent: Nov. 10, 1998

[54] TECHNIQUE FOR IMPROVING THE BLIND CONVERGENCE OF A TWO-FILTER ADAPTIVE EQUALIZER

[75] Inventors: Jean-Jacques Werner, Holmdel; Jian Yang, Red Bank, both of N.J.

[73] Assignee: Lucent Technologies Inc., Murray Hill, N.J.

[21] Appl. No.: 717,582

[22] Filed: Sep. 18, 1996

[51] Int. Cl.$^6$ ................................................. H04L 27/01
[52] U.S. Cl. ........................ 375/235; 375/232; 375/350; 364/724.2
[58] Field of Search ................................. 375/229, 230, 375/232, 234, 235, 266, 350; 364/724.2

[56] References Cited

U.S. PATENT DOCUMENTS

| 4,227,152 | 10/1980 | Godard et al. | 375/13 |
|---|---|---|---|
| 4,308,618 | 12/1981 | Levy et al. | 375/235 |
| 4,646,173 | 2/1987 | Kammeyer et al. | 360/51 |

OTHER PUBLICATIONS

Y. Sato, "A Method of Self–Recovering Equalization for Multilevel Amplitude–Modulation Systems," IEEE Trans. Commun., pp. 679–682, Jun. 1975.

A. Benveniste and M. Goursat, "Blind Equalizers", IEEE Trans. Commun., vol. 32, No. 8, pp. 871–883, 1984.

N. K. Jablon, "Joint Blind Equalization, Carrier Recovery, and Timing Recovery for High–Order QAM Signal Constellations", IEEE Trans. Signal Processing, vol. 40, No. 6, pp. 1383–1897, 1992.

S. Chen, S. McLaughlin, P. M. Grant and B. Mulgrew, "Multi–Stage Blind Clustering Equaliser", IEEE Trans. Commun., vol. 43, No. 2/3/4, pp. 701–705, Feb./Mar./Apr. 1995.

J. K. Tugnait, "Blind Eqalization and Estimation of Digital Communication FIR Channels Using Cumulant Matching", IEEE Trans. Commun., vol. 43, No. 2/3/4 pp. 1240–1245, Feb./Mar./Apr. 1995.

J. J. Werner, "Tutorial on Carrierless AM/PM–Part I–Fundamentals and Digital CAP Transmitter", Contribution to ANSI X3T9.5 TP/PMD Working Group, Minneapolis, Jun. 23, 1992.

*Primary Examiner*—Stephen Chin
*Assistant Examiner*—Jeffrey W. Gluck
*Attorney, Agent, or Firm*—Joseph J. Opalach

[57] ABSTRACT

A blind equalization cost function called the "constrained Hilbert cost function" (CHCF) provides for reliable blind convergence of a two-filter equalizer structure. In particular, the CHCF cost function is designed in such a way that the two filters are constrained to be a Hilbert pair. Advantageously, this technique can be used with any blind equalization algorithms, such as RCA, CMA, and MMA.

39 Claims, 11 Drawing Sheets

PHASE-SPLITTING FSLE

UNEQUALIZED SIGNAL CONSTELLATION

START OF MMA

MODULI FOR IN-PHASE DIMENSION

MODULI FOR QUADRATURE PHASE DIMENSION

MODULI FOR BOTH DIMENSIONS

AFTER CONVERGENCE WITH MMA

AFTER CONVERGENCE WITH 64-POINT SLICER

| MAIN CHARACTERISTICS OF THEM BLIND EQUALIZATION ALGORITHMS | | | |
|---|---|---|---|
| ALGORITHM | RELIABILITY | COMPLEXITY | SPEED OF CONVERGENCE |
| RCA | LOW | LOW | SECOND FASTEST |
| MMA | HIGH | MEDIUM | FASTEST |
| CMA | VERY HIGH | HIGH | SLOWEST |

FIG. 19

| VALUES OF THE CONSTANTS R, $R_1$ AND $R_2$ FOR SYMBOL LEVELS ±1, ±3, ±5, ±7, ... ||||||||
|---|---|---|---|---|---|---|---|
| ALGORITHM | 4-CAP | 16-CAP | 32-CAP | 64-CAP | 128-CAP | 256-CAP | 512-CAP |
| RCA | 1 | 2.50 | 3.64 | 5.25 | 7.45 | 10.625 | 15.00 |
| MMA | 1 | 2.86 | 4.32 | 6.08 | 8.88 | 12.34 | 17.87 |
| CMA | 1.414 | 3.633 | 5.11 | 7.616 | 10.49 | 15.39 | 21.11 |
| MMA $R_1$ | -- | -- | 4.49 | -- | 9.22 | -- | 18.55 |
| MMA $R_2$ | -- | -- | 2.86 | -- | 6.08 | -- | 12.34 |

DIAGONAL SOLUTION FOR 64-CAP

TAP UPDATING OF THE TWO-FILTER STRUCTURE WITH THE CONSTRAINED HILBERT COST FUNCTION

TECHNIQUE FOR IMPROVING THE BLIND CONVERGENCE OF A TWO-FILTER ADAPTIVE EQUALIZER

CROSS-REFERENCE TO RELATED APPLICATIONS

Related subject matter is disclosed in the co-pending, commonly assigned, U.S. patent application of Werner et al., entitled "Blind Equalization," Ser. No. 08/646,404, filed on May 7, 1996.

BACKGROUND OF THE INVENTION

The present invention relates to communications equipment, and, more particularly, to blind equalization in a receiver.

In blind equalization, the adaptive filters of a receiver are converged without the use of a training signal. As known in the art, there are two techniques for blind equalization: one is referred to herein as the "reduced constellation algorithm" (RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, the co-pending, commonly assigned, U.S. patent application of Werner et al., entitled "Blind Equalization," Ser. No. 08/646,404, filed on May 7, 1996, presents a new blind equalization technique—the multimodulus algorithm (MMA)—as an alternative to the above-mentioned RCA and CMA approaches.

However, for all blind equalization approaches the most fundamental performance issue is the ability to achieve reliable initial convergence—else the adaptive filter may converge to a wrong solution. As used herein, an adaptive filter is, e.g., a fractionally spaced linear equalizer (FSLE), which is hereafter simply referred to as an equalizer.

There are several equalizer structures that can be used for blind equalization, such as the cross-coupled complex filter, or the four-filter structure, as known in the art. However, based on trade-offs between complexity and steady-state performance, it is generally better to use a two-filter structure for blind start-up. An illustrative two-filter structure is shown in FIG. 2. This two-filter structure has two filters whose impulse responses form a Hilbert pair. However, the two filters are independently updated in their own channels, and some wrong solutions may be created due to the lack of coupling between the two channels.

For example, one type of wrong solution is known in the art as the "diagonal solution." The latter is generated when the equalizer converges to a diagonal signal point constellation. It has been found that frequency of occurrence of diagonal solutions is mostly communications channel dependent. Specifically, it is created when certain fractional propagation delay offsets are introduced in the channel. An illustrative diagonal solution obtained with a 64-CAP (carrierless, amplitude modulation, phase modulation) signal point constellation in computer simulations is shown in FIG. 20. In contrast, FIG. 16 shows an illustrative correct solution for a 64-CAP signal point constellation using the above-mentioned MMA blind equalization algorithm. (The term "64-CAP," refers to the number of predefined symbols in the signal space or signal constellation each symbol representing 6 bits since $2^6=64$. Additional information on a CAP communications system can be found in J. J. Werner, "Tutorial on Carrierless AM/PM—Part I—Fundamentals and Digital CAP Transmitter," *Contribution to ANSI X3T9.5 TP/IPMD Working Group*, Minneapolis, Jun. 23, 1992.)

SUMMARY OF THE INVENTION

We have realized a technique that provides reliable blind convergence of an equalizer for a two-filter structure. In particular, the cost function of a blind equalization algorithm is designed in such a way that the two filters are constrained to be a Hilbert pair. As used herein, this new blind equalization cost function is called the "constrained Hilbert cost function" (CHCF). Advantageously, this technique can be used with any blind equalization algorithms, such as RCA, CMA, and MMA.

In an embodiment of the invention, the RCA algorithm is modified to include the CHCF.

In another embodiment of the invention, the MMA algorithm is modified to include the CHCF.

BRIEF DESCRIPTION OF THE DRAWING

FIG. 19 shows a table of illustrative data values for use in the RCA, CMA, and MMA, blind equalization methods;

DETAILED DESCRIPTION

Figure 1:
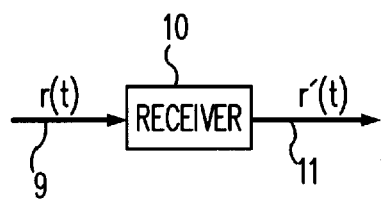
FIG. 1 is an illustrative block diagram of a portion of a communications system embodying the principles of the invention.

An illustrative high-level block diagram of a portion of a communications system embodying the principles of the invention is shown in FIG. 1. For illustrative purposes only, it is assumed that receiver 10 receives a CAP signal, which can be represented by:

$$r(t) = \sum_n [a_n p(t-nT) - b_n \tilde{p}(t-nT)] + \xi(t) \quad (1)$$

where $a_n$ and $b_n$ are discrete-valued multilevel symbols, $p(t)$ and $\tilde{p}(t)$ are impulse responses which form a Hilbert pair, $T$ is the symbol period, and $\xi(t)$ is additive noise introduced in the channel.

It is assumed that the CAP signal in equation (1) has been distorted while propagating through communications channel 9 and experiences intersymbol interference (ISI). This ISI consists of intrachannel ISI ($a_n$ or $b_n$ symbols interfering with each other) and interchannel ISI ($a_n$ and $b_n$ symbols interfering with each other). The purpose of receiver 10 is to remove the ISI and minimize the effect of the additive noise $\xi(t)$ to provide signal $r'(t)$. Since the inventive concept is generally applicable to any blind equalization algorithm, the inventive concept will illustratively be described in the context of the RCA and MMA algorithms which can be used within receiver 10. However, before describing the inventive concept, some background information on equalizers and the above-mention RCA, CMA, and MMA algorithms is presented.

Equalizer Structures

Figure 2:
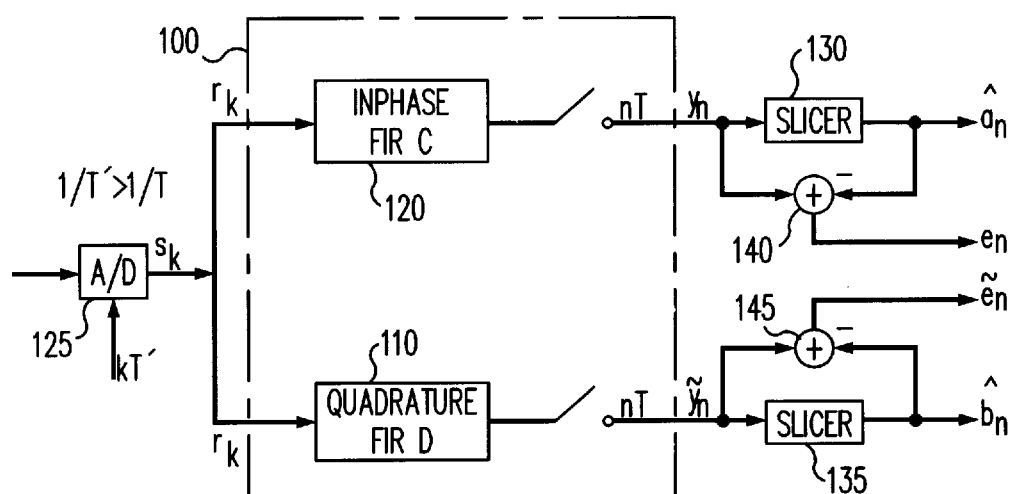
FIG. 2 is an illustrative block diagram of a phase-splitting equalizer.
Figure 3:
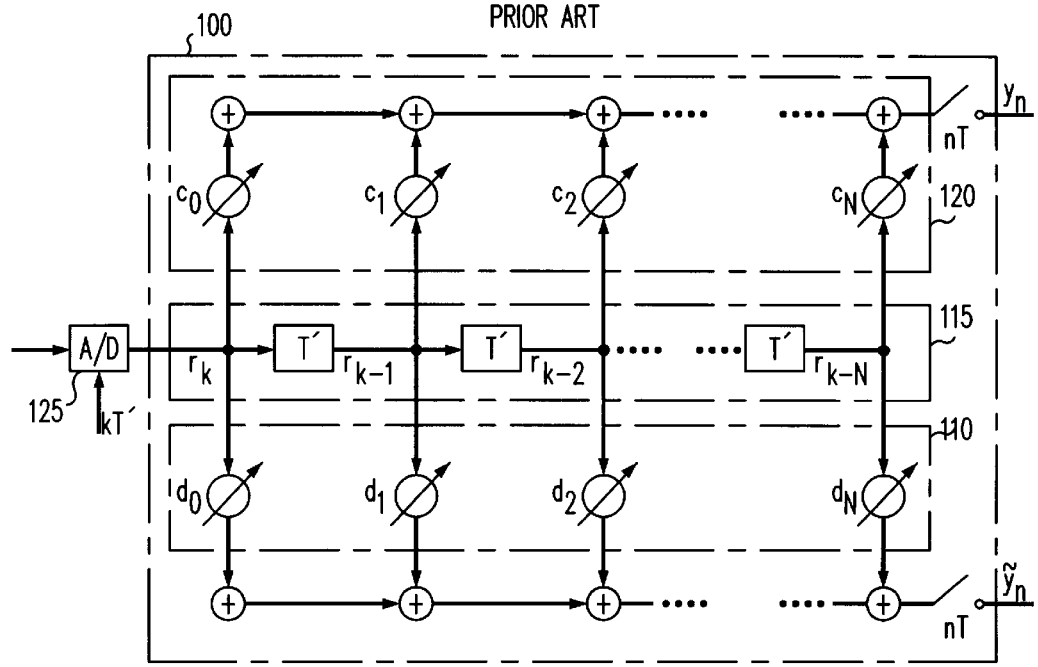
FIG. 3 is an illustrative block diagram of a portion of an adaptive filter for use in an equalizer.

An illustrative phase-splitting FSLE equalizer 100 is shown in FIG. 2. It is assumed that FSLE equalizer 100 operates on an input signal comprising two dimensions: an in-phase component and a quadrature component. FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 3. The two FIR filters 110 and 120 share the same tapped delay line 115, which stores sequences of successive Analog-to-Digital Converter (A/D) 125 samples $r_k$. The sampling rate $1/T'$ of A/D 125 is typically three to four times higher than the symbol rate $1/T$ and is chosen in such a way that it satisfies the sampling theorem for real signals. It is assumed that $T/T'=i$, where $i$ is an integer.

The outputs of the two adaptive FIR filters 110 and 120 as shown in FIG. 3 are computed at the symbol rate $1/T$. The equalizer taps and input samples can be represented by a corresponding N-dimensional vector. As such, the following relationships are now defined:

$r_n^T = [r_k, r_{k-1}, \ldots, r_{k-N}]$ = vector of A/D samples in delay line; (2)

$c_n^T = [c_0, c_1, c_2, \ldots, c_N]$ = vector of in-phase tap coefficients; and (3)

$d_n^T = [d_0, d_1, d_2, \ldots, d_N]$ = vector of quadrature phase tap coefficients; (4)

where the superscript T denotes vector transpose, the subscript n refers to the symbol period nT, and k=in.

Let $y_n$ and $\tilde{y}_n$ be the computed outputs of the in-phase and quadrature filters, respectively, and:

$y_n = c_n^T r_n$; and (5)

$\tilde{y}_n = d_n^T r_n$. (6)

Figure 6:
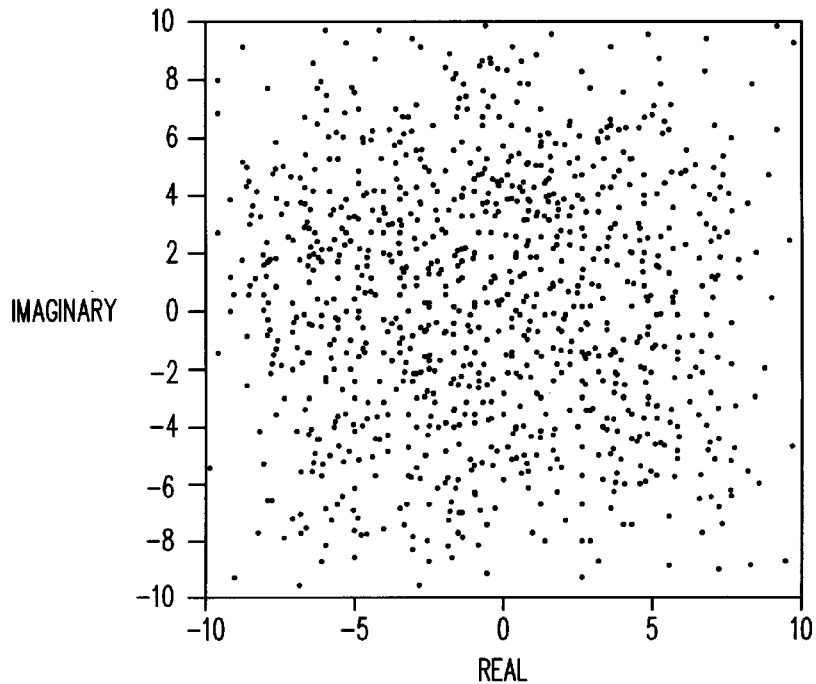
FIG. 6 is an illustrative signal point plot of an output signal of an equalizer before convergence.
Figures 17, 18:
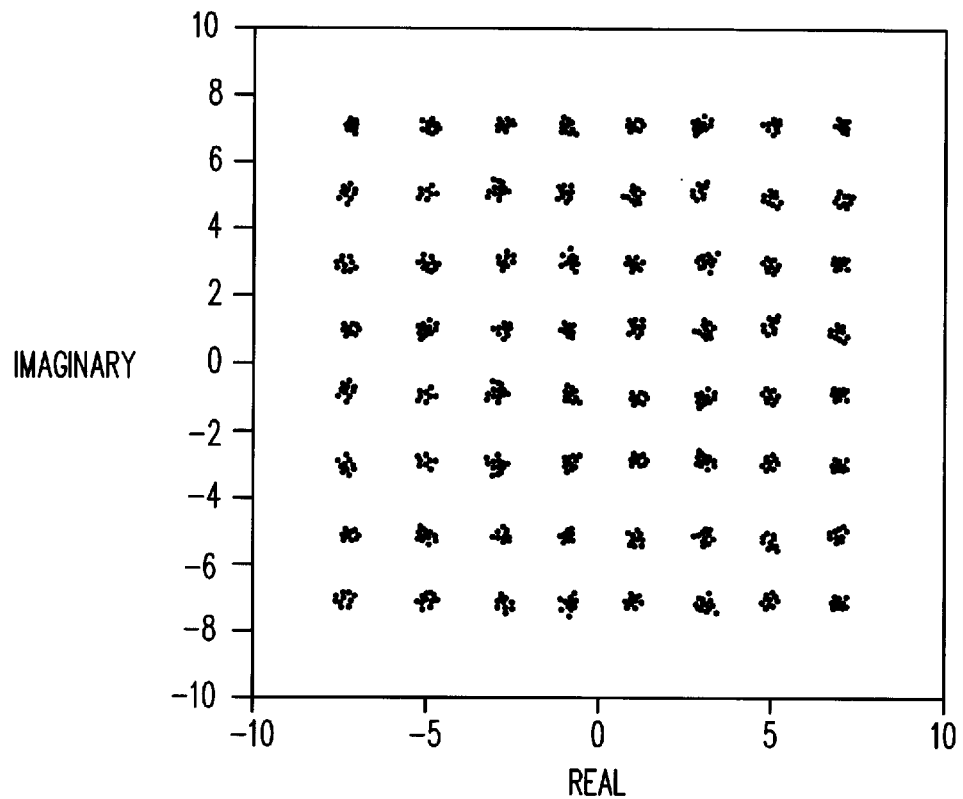
FIG. 18 shows a table providing a general comparison between the RCA, CMA, and MMA, blind equalization methods, without CHCF.

An X/Y display of the outputs $y_n$ and $\tilde{y}_n$ or, equivalently, of the complex output $Y_n = y_n + j\tilde{y}_n$, is called a signal constellation. FIGS. 6 and 17 show a 64-CAP constellation before and after illustrative convergence using the MMA algorithm. After convergence, the signal constellation consists of a display of the complex symbols $A_n = a_n + jb_n$ corrupted by some small noise and ISI.

In the normal mode of operation, decision devices (or slicers) 130 and 135 shown in FIG. 2 compare the sampled outputs $y_n$ and $\tilde{y}_n$ of equalizer 100 with valid symbol values $a_n$ and $b_n$ and make a decision on which symbols have been transmitted. These sliced symbols will be denoted $\hat{a}_n$ and $\hat{b}_n$. The receiver then computes the following in-phase and quadrature errors $e_n$ and $\tilde{e}_n$:

$e_n = y_n - a_n$, (7a)

$\tilde{e}_n = \tilde{y}_n - \tilde{b}_n$, (7b)

and the tap coefficients of the two adaptive filters are updated using the familiar least-mean-square (LMS) algorithm, i.e., $c_{n+1} = c_n - \alpha e_n r_n$, (8a)

$d_{n+1} = d_n - \alpha \tilde{e}_n r_n$, (8b)

where $\alpha$ is the step size used in the tap adjustment algorithm.

Figure 4:
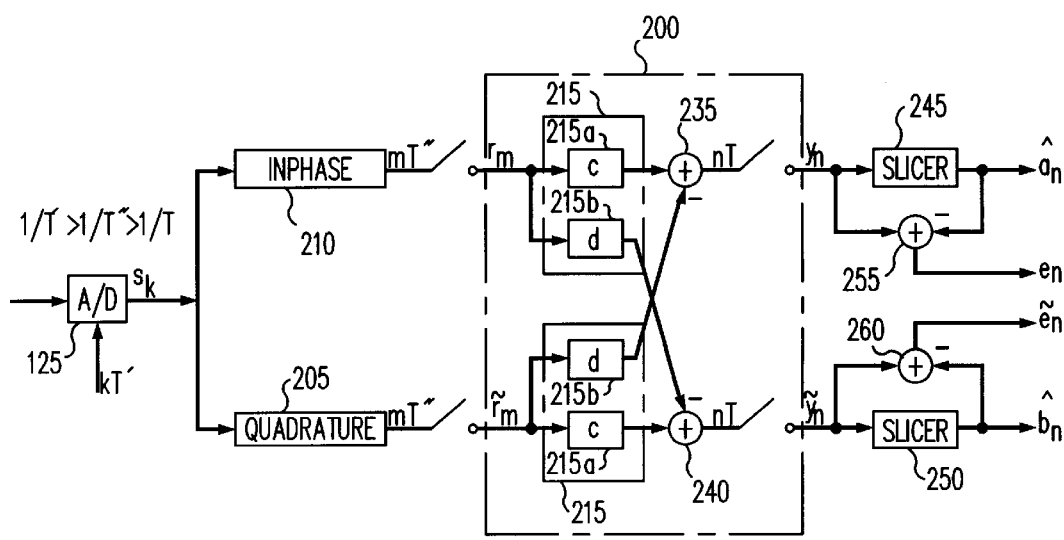
FIG. 4 is an illustrative block diagram of a cross-coupled equalizer.

Turning now to FIG. 4, a cross-coupled FSLE, 200, is shown. For this equalizer structure, the A/D samples are first fed to two fixed in-phase and quadrature FIR filters, 210 and 205, respectively. In this case, the sampling rate $1/T'$ of A/D 125 is typically equal to four times the symbol rate $1/T$. The outputs of the two fixed FIR filters are computed at a rate $1/T''$ that is consistent with the sampling theorem for analytic signals as known in the art. The output signals are then fed to equalizer 200 having a so-called cross-coupled structure. Typically, $1/T''$ is twice the symbol rate $1/T$.

The cross-coupled equalizer 200 uses two adaptive FIR filters 215a and 215b, each with tap vectors $c_n$ and $d_n$. For simplicity, the same tap vector notations $c_n$ and $d_n$ (which have been used for the previous described equalizer 100 of FIG. 2) are used again. However, it should be clear to those skilled in the art that the tap vectors are different for the two types of equalizers. These two filters are each used twice to compute the outputs $y_n$ and $\tilde{y}_n$ of the equalizer. Let $r_n$ and $\tilde{r}_n$ be the output vectors of the in-phase and quadrature filters that are used to compute the outputs of the cross-coupled equalizer. The following definitions can be made:

$C_n = c_n + jd_n$, (9a)

$R_n = r_n + j\tilde{r}_n$, and (9b)

$Y_n = y_n + j\tilde{y}_n$. (9c)

The complex output $Y_n$ of the equalizer can be written in the following compact way:

$Y_n = C_n^{*T} R_n$, (10)

where the asterisk * denotes complex conjugate. Making the following definitions for the sliced complex symbol $\hat{A}_n$ and the complex error $E_n$:

$\hat{A}_n = \hat{a}_n + j\hat{b}_n$, (11a)

$$E_n = Y_n - \hat{A}_n. \tag{11b}$$

The LMS algorithm for updating the complex tap vector $C_n$ can be written as:

$$C_{n+1} = C_n - \alpha E_n^* R_n. \tag{12}$$

Figure 5:
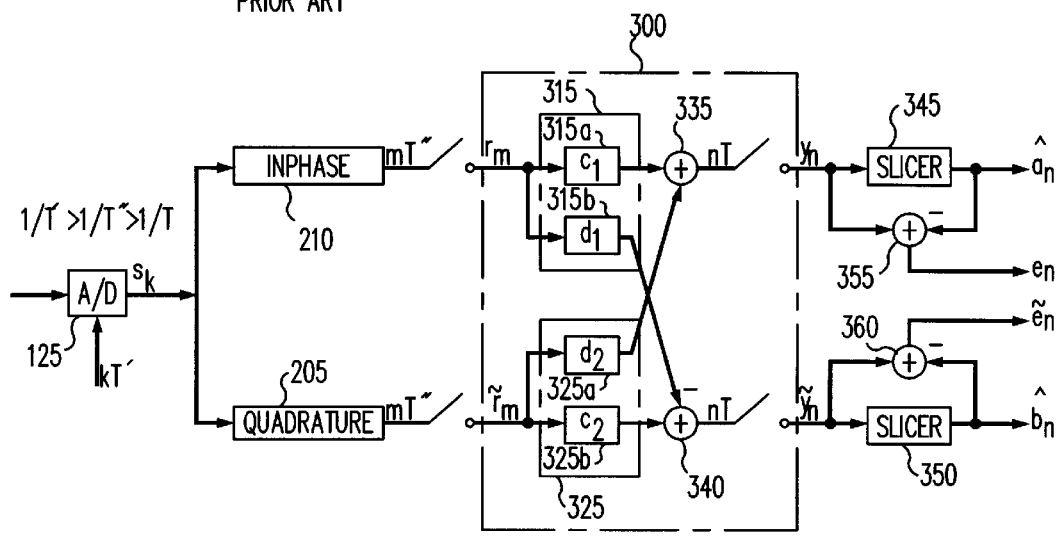
FIG. 5 is an illustrative block diagram of a four-filter equalizer.

Turning now to FIG. 5, a four-filter FSLE is shown. Four-filter equalizer 300 has the same general structure as cross-coupled FSLE 200 shown in FIG. 4, except that the adaptive portion consists of four different filters rather than two filters which are used twice. For this reason it is called a four-filter FSLE. The two output signals of equalizer 300 are computed as follows:

$$y_n = c_{1,n}^T r_n + d_{2,n}^T \hat{r}_n, \text{ and} \tag{13a}$$

$$\hat{y}_n = c_{2,n}^T \hat{r}_n - d_{1,n}^T r_n. \tag{13b}$$

Using the definitions for the in-phase and quadrature errors $e_n$ and $\hat{e}_n$ in equations (7a) and (7b), the following tap updating algorithms for the four filters result:

$$c_{1,n+1} = c_{1,n} - \alpha e_n r_n, \tag{14a}$$

$$d_{1,n+1} = d_{1,n} + \alpha \hat{e}_n r_n, \tag{14b}$$

$$c_{2,n+1} = c_{2,n} - \alpha \hat{e}_n \hat{r}_n, \text{ and} \tag{15a}$$

$$d_{2,n+1} = d_{2,n} - \alpha e_n \hat{r}_n. \tag{15b}$$

Having generally described the structure of some prior-art equalizers as shown in FIGS. 2–5, a general overview of the concept of blind equalization will now be described using the equalizer structure of FIG. 2.

Concept of Blind Equalization

In the normal (steady-state) mode of operation, the decision devices in FIG. 2, i.e., slicers 130 and 135, compare the equalizer complex output samples, $Y_n$, (where $Y_n = y_n + j\hat{y}_n$), with all the possible transmitted complex symbols, $A_n$ (where $A_n = a_n + jb_n$), and selects the symbol $\hat{A}_n$ which is the closest to $Y_n$. The receiver then computes an error, $E_n$, where:

$$E_n = Y_n - \hat{A}_n, \tag{16}$$

which is used to update the tap coefficients of equalizer 100. This type of tap adaptation is called "unconstrained decision directed" (hereinafter simply referred to as "decision directed"), because it uses the decisions of slicers 130 and 135. (Although it is known that a blind equalization algorithm can also be referred to as a "constrained decision directed" algorithm, the phrase "decision directed" is used herein to refer to unconstrained decision directed algorithms such as the LMS algorithm.) The most common tap updating algorithm is the LMS algorithm, which is a stochastic gradient algorithm that minimizes the mean square error (MSE), which is defined as:

$$\text{MSE} \triangleq E[|E_n|^2] = E[|Y_n - \hat{A}_n|^2] = E[e_n^2] + E[\tilde{e}_n^2], \tag{17}$$

where $E[\cdot]$ denotes expectation and $e_n$ and $\tilde{e}_n$ are in-phase and quadrature errors, respectively.

At the beginning of start-up, the output signal of equalizer 100, $Y_n$, is corrupted by a lot of intersymbol interference, as illustrated in FIG. 6. The latter represents experimental data obtained for a 64-CAP receiver using a phase-splitting FSLE as represented by FIG. 2.

When a training sequence is used during start-up (i.e., a predefined sequence of $A_n$ symbols), the receiver can compute meaningful errors $E_n$ by using the equalizer output signal $Y_n$ and the known sequence of transmitted symbols $A_n$. In this case, tap adaptation is said to be done with "ideal reference" to distinguish it from decision directed tap adaptation.

However, when no training sequence is available, equalizer 100 has to be converged blindly. In this case, a decision-directed tap updating algorithm cannot be used to converge the equalizer, because the slicer makes too many wrong decisions, as should be apparent from FIG. 6.

As such, the philosophy of blind equalization is to use a tap adaptation algorithm that minimizes a cost function that is better suited to provide initial convergence of equalizer 100 than the MSE represented by equation (17). The cost functions used in the RCA, CMA, and MMA algorithms are described below.

Convergence of an equalizer during blind start-up usually consists of two main steps. First, a blind equalization algorithm is used to open the "eye diagram." (Hereafter, this will be referred to as "it opens the eye.") Once the eye is open enough, the receiver switches to a decision directed tap adaptation algorithm.

Reduced Constellation Algorithm (RCA)

This section provides a general overview of the RCA algorithm. This general overview is then followed with a description of the RCA algorithm in the context of each of the illustrative equalizer structures, described above.

Figure 8:
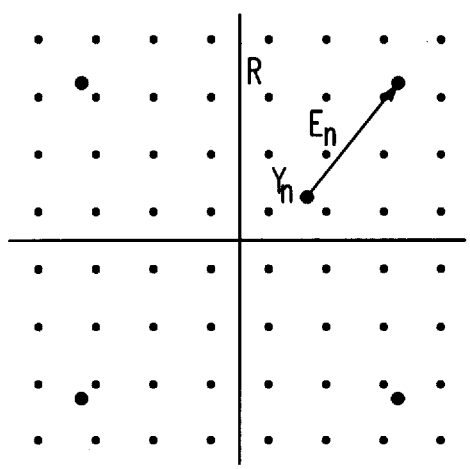
FIG. 8 is an illustrative signal point plot illustrating the reduced signal point constellation of the RCA blind equalization method.

With the RCA algorithm, the error used in the tap updating algorithm is derived with respect to a signal constellation that has a smaller number of points than the received constellation. As illustration, it is again assumed that the signal constellation comprises 64 symbols. In the RCA algorithm, the reduced constellation typically consists of four signal points only, as shown in FIG. 8. It should be noted that the RCA algorithm requires the use of a decision device, e.g., a slicer, to select the closest signal point from the reduced constellation. The error between the received sample $Y_n$ and the closest signal point $\hat{A}_{r,n}$ of the reduced constellation is the complex number:

$$E_{r,n} = e_{r,n} + j\tilde{e}_{r,n} = Y_n - \hat{A}_{r,n}, \text{ where} \tag{18}$$

$$\hat{A}_{r,n} = \hat{a}_{r,n} + j\hat{b}_{r,n} = R[\text{sgn}(y_n) + j\text{sgn}(\tilde{y}_n)], \text{ and} \tag{19}$$

where sgn $(\cdot)$ is the signum function and the expression on the right corresponds to the case where the reduced constellation consists of four points. The reduced constellation algorithm minimizes the following cost function:

$$\text{CF} = E[|E_{r,n}|^2] = E[e_{r,n}^2 + \tilde{e}_{r,n}^2] = E[|Y_n - \hat{A}_{r,n}|^2], \tag{20}$$

where $E[\cdot]$ denotes expectation and where $e_{r,n}$ refers to the slicer error.

Now, consider the phase-splitting equalizer structure shown in FIG. 2. Using equations (5), (6), and (20), the following equations result:

$$e_{r,n} = y_n - \hat{a}_{r,n} = c_n^T r_n - R \text{sgn}(y_n), \tag{21a}$$

$$\tilde{e}_{r,n} = \tilde{y}_n - \hat{b}_{r,n} = d_n^T r_n - R \text{sgn}(\tilde{y}_n) \tag{21b}$$

The gradients of the cost function represented by equation (20) with respect to the tap vectors $c_n$ and $d_n$ are equal to:

$$\nabla_c(\text{CF}) = 2E[e_{r,n} r_n], \text{ and} \tag{22a}$$

$$\nabla_d(\text{CF}) = 2E[\tilde{e}_{r,n} r_n]. \tag{22b}$$

These gradients are equal to zero when the channel is perfectly equalized, i.e., when the received samples $Y_n$ are equal to the symbol values $A_n$. This condition leads to the following value of R:

$$R = \frac{E[a_n^2]}{E[|a_n|]} . \tag{23}$$

For example, consider the gradient with respect to the tap vector $c_n$. From the left of equations (21a) and (21b) there is the condition: $E[(y_n-R \; sgn(y_n))r_n]=0$. With perfect equalization $y_n=a_n$. Also, if it is assumed that different symbols are uncorrelated, then: $E[a_n r_n]=k_n E[a_n^2]$, where $k_n$ is a fixed vector whose entries are a function of the channel. The above condition can then be written as: $E[a_n^2]-R \; E[sgn(a_n) a_n]=0$. Noting that $sgn \; (a_n)a_n=|a_n|$ and solving for R, equation (23) results.

The nonaveraged gradients in equations (22a) and (22b) can be used in a stochastic gradient algorithm to adapt the tap coefficients of the equalizer, so that the following tap updating algorithms result:

$$c_{n+1}=c_n-\alpha[y_n-R \; sgn(y_n)]r_n, \text{ and} \tag{24a}$$

$$d_{n+1}=d_n-\alpha[\tilde{y}_n-R \; sgn \; (\tilde{y}_n)]r_n. \tag{24b}$$

Turning now to the cross-coupled FSLE structure illustrated by FIG. 4, the complex output $Y_n$ of this equalizer is computed from equation (10). Using this expression in equation (20), the gradient of the cost function with respect to the complex tap vector $C_n$ is:

$$\nabla_c=E[(Y_n-\hat{A}_{r,n})^*R_n]. \tag{25}$$

Assuming a perfectly equalized channel the following expression for R results:

$$R = \frac{E[|A_n|^2]}{E[|a_n|]+E[|b_n|]} = \frac{E[|A_n|^2]}{2E[|a_n|]} , \tag{26}$$

where the expression on the right is the same as the one in equation (23) for the usual case where $E[|a_n|]=E[|b_n|]$. The tap updating algorithm for the complex tap vector $C_n$ is given by $$C_{n+1}=C_n-\alpha(Y_n-\hat{A}_{r,n})^*R_n \tag{27}$$

Turning now to the four-filter FSLE structure illustrated by FIG. 5, the outputs $y_n$ and $\tilde{y}_n$ of this four-filter equalizer structure are computed from equations (13a) and (13b). The gradients of the cost function in equation (20) with respect to the four tap vectors are similar to the ones given in equations (22a) and (22b) and will not be repeated here. The tap updating algorithms are given by:

$$c_{1,n+1}=c_{1,n}-\alpha[y_n-R \; sgn(y_n)]r_n, \tag{28a}$$

$$d_{1,n+1}=d_{1,n}+\alpha[\tilde{y}_n-R \; sgn \; (\tilde{y}_n)]r_n \tag{28b}$$

$$c_{2,n+1}=c_{2,n}-\alpha[\tilde{y}_n-R \; sgn(\tilde{y}_n)]\tilde{r}_n, \text{ and} \tag{28c}$$

$$d_{2,n+1}=d_{2,n}-\alpha[y_n-R \; sgn \; (y_n)]\tilde{r}_n, \tag{28d}$$

where the constant R is the same as in equation (23).

The main advantage of RCA is its low cost of implementation because it is typically the least complex of blind equalization algorithms. The tap updating algorithms represented by equations (24a), (24b), (27) and (28) are the same as the standard LMS algorithms represented by equations (8a) and (8b) except that the slicer uses a different number of points.

The main disadvantages of RCA are its unpredictability and lack of robustness. The algorithm is known to often converge to so-called "wrong solutions." These solutions are quite acceptable from a channel equalization perspective, but do not allow the receiver to recover the right data. It should be pointed out that the equalizer structure in FIG. 2 is much more likely to converge to wrong solutions than the structure in FIG. 4. This is due to the fact that the former has many more degrees of freedom than the latter.

Figure 20:
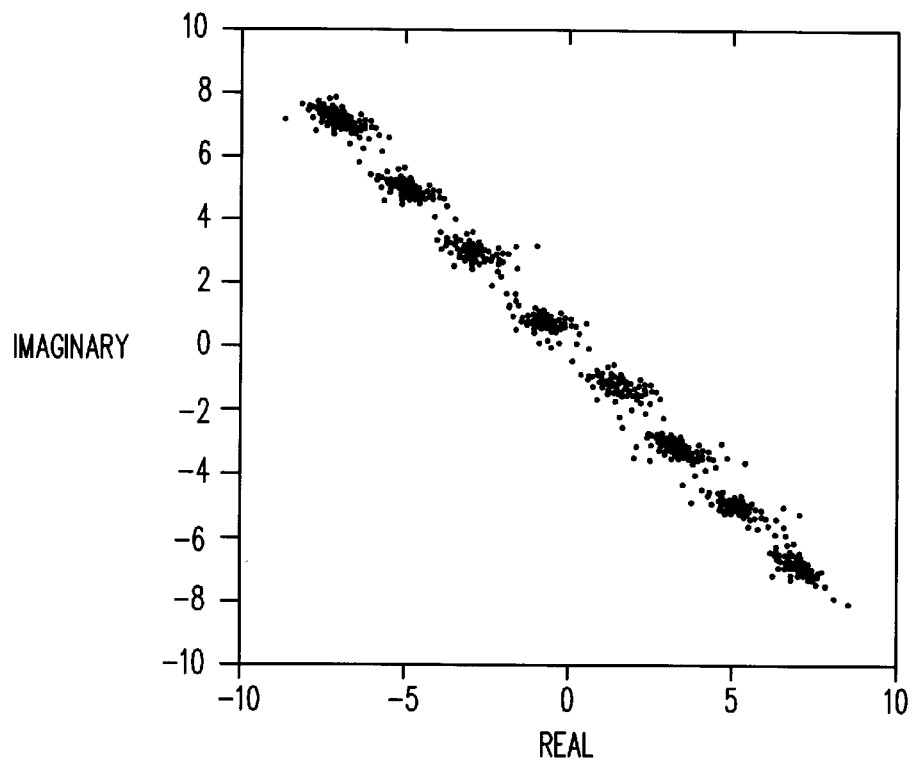
FIG. 20 is an illustrative graph of an incorrect diagonal solution for a 64-CAP signal point constellation.

A wrong solution that is often observed with the equalizer structure in FIG. 2 is the so-called diagonal solution. In this case, the in-phase and quadrature filters both converge to the same filter, so that they both generate the same output samples. As a result, the signal constellation at the output of the equalizer consists of points clustered along a diagonal as illustrated in FIG. 20.

Other wrong solutions can occur when the in-phase and quadrature filters introduce propagation delays which differ by an integral number of symbol periods. As an example, at a given sampling instant, $a_n$ may appear at the output of the in-phase filter while $b_{n-1}$ appears at the output of the quadrature filter. This kind of wrong solution can generate points in the signal constellation at the output of the equalizer that do not correspond to transmitted symbols. For example, a 32-point signal constellation may be converted into a 36-point constellation and the 128-point constellation in FIGS. 13, 14, and 15 may be converted into a 144-point constellation.

Constant Modulus Algorithm (CMA)

This section provides a general overview of the CMA algorithm. This general overview is then followed with a description of the CMA algorithm in the context of each of the illustrative equalizer structures, described above.

Figure 9:
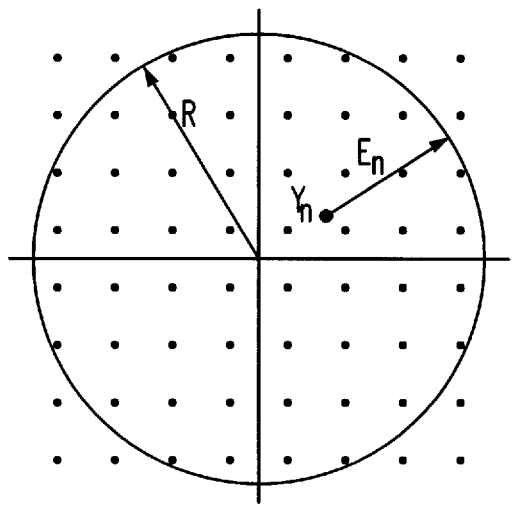
FIG. 9 is an illustrative signal point plot illustrating the circular contour of the CMA blind equalization method.

The CMA algorithm minimizes the dispersion of the equalized samples $Y_n$ with respect to a circle with radius R. This is graphically illustrated in FIG. 9. The CMA algorithm minimizes the following cost function:

$$CF=E[(|Y_n|^L-R^L)^2], \tag{29}$$

where L is a positive integer. The case L=2 is the most commonly used in practice. The cost function in equation (29) is a true two-dimensional cost function which minimizes the dispersion of the equalizer complex output signal $Y_n$ with respect to a circular two-dimensional contour.

Now, consider the phase-splitting equalizer structure shown in FIG. 2. The gradients of the cost function with respect to the tap vectors $c_n$ and $d_n$ are given by:

$$\nabla_c(CF)=2L\times E[(|Y_n|^L-R^L)|Y_n|^{L-2}y_n r_n], \text{ and} \tag{30a}$$

$$\nabla_d(CF)=2L\times E[(|Y_n|^L-R^L)|Y_n|^{L-2}\tilde{y}_n r_n]. \tag{30b}$$

Assuming a perfectly equalized channel the following value for $R^L$ results:

$$R^L = \frac{E[|A_n|^{2L-2}a_n^2]}{E[|A_n|^{L-2}a_n^2]} = \frac{E[|A_n|^{2L}]}{E[|A_n|^L]} , \tag{31}$$

where the expression on the right holds for the usual case where the statistics of the symbols $a_n$ and $b_n$ are the same. For L=2, the following stochastic gradient tap updating algorithms results:

$$c_{n+1}=c_n-\alpha(y_n^2+\tilde{y}_n^2-R^2)y_n r_n, \text{ and} \tag{32a}$$

$$d_{n+1}=d_n-\alpha(y_n^2+\tilde{y}_n^2-R^2)\tilde{y}_n r_n. \tag{32b}$$

Turning now to the cross-coupled FSLE structure illustrated by FIG. 4, the gradient of the cost function represented by equation (29) with respect to the complex tap vector $C_n$ is equal to:

$$\nabla_c(CF)=2L\times E[(|Y_n|^L-R^L)|Y_n|^{L-2}Y_n^*R_n]. \quad (33)$$

For L=2, the tap updating algorithm for the complex tap vector becomes:

$$C_{n+1}=C_n-\alpha(|Y_n|^2-R^2)Y_n^*R_n, \quad (34)$$

where R is given by the expression on the right in equation (31).

Turning now to the four-filter FSLE structure illustrated by FIG. 5, the gradients of the cost function represented by equation (29) with respect to the four tap vectors are similar to the ones given by equations (30a) and (30b). For L=2, the tap updating algorithms become:

$$c_{1,n+1}=c_{1,n}-\alpha(y_n^2+\tilde{y}_n^2-R^2)y_n r_n, \quad (35a)$$

$$d_{1,n+1}=d_{1,n}+\alpha(y_n^2+\tilde{y}_n^2-R^2)\tilde{y}_n r_n, \quad (35b)$$

$$c_{2,n+1}=c_{2,n}-\alpha(y_n^2+\tilde{y}_n^2-R^2)\tilde{y}_n\tilde{r}_n, \text{ and} \quad (35c)$$

$$d_{2,n+1}=d_{2,n}-\alpha(y_n^2+\tilde{y}_n^2-R^2)y_n\tilde{r}_n, \text{ and} \quad (35d)$$

The constant R is the same as in equation (31).

The main advantages of CMA are its robustness and predictability. Unlike RCA, it rarely converges to wrong solutions. For some applications, other than those considered here, it also has the advantage of being able to partially equalize the channel in the presence of carrier phase variations. The main disadvantage of CMA is its cost of implementation. The CMA tap updating algorithm is more complex than that of the RCA algorithm and the MMA algorithm and, in addition, the CMA algorithm requires a so-called "rotator" at the output of the equalizer. As a result, once a certain degree of convergence is achieved, the output signal of the equalizer must be counter-rotated before switching to a decision-directed tap adaptation algorithm. The need to use a rotator after the equalizer increases the cost of implementation of CMA for some types of applications. It should be pointed out, however, that there are other applications, such as voiceband and cable modems, where the rotator function is required anyway for other purposes, such as tracking frequency offset introduced in the channel. In these latter cases, the need to do a rotation does not increase the cost of implementation, and CMA becomes a very attractive approach.

Multimodulus Algorithm (MMA)

Figure 10:
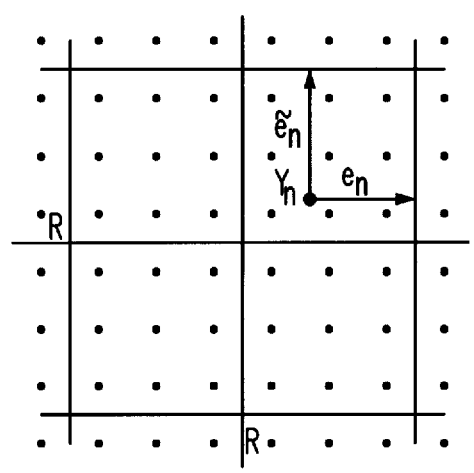
FIG. 10 is an illustrative signal point plot illustrating the piecewise linear contours of the MMA blind equalization method.

The MMA algorithm minimizes the dispersion of the equalizer output samples $y_n$ and $\tilde{y}_n$ around piecewise linear in-phase and quadrature contours. For the special case of square signal constellations of the type used for 16-, 64-, and 256-CAP systems, the contours become straight lines. This is graphically illustrated in FIG. 10 for a 64-point constellation. The multimodulus algorithm minimizes the following cost function:

$$CF=E[(y_n^L-R^L(Y_n))^2+(\tilde{y}_n^L-\tilde{R}^L(Y_n))^2] \quad (36)$$

where L is a positive integer and $R(Y_n)$ and $\tilde{R}(Y_n)$ take discrete positive values, which depend on the equalizer outputs $Y_n$.

Multimodulus Algorithm (MMA)—Square Constellations

For square constellations, $R(Y_n)=\tilde{R}(Y_n)=R$=constant, so that the cost function of equation (36) becomes:

$$CF=CF_I+CF_Q=E[(y_n^L-R^L)^2+(\tilde{y}_n^L-R^L)^2]. \quad (37)$$

Unlike the cost function for CMA represented by equation (29), this is not a true two-dimensional cost function. Rather, it is the sum of two independent one-dimensional cost functions $CF_I$ and $CF_Q$. The application of the MMA algorithm in the context of the three illustrative types of equalizers (described above) will now be described.

For the phase-splitting equalizer structure shown FIG. 2, the gradients of the cost function in equation (37) with respect to the tap vectors $c_n$ and $d_n$ are equal to:

$$\nabla_c(CF)=2L\times E[(|y_n|^L-R^L)|y_n|^{L-2}y_n r_n], \text{ and} \quad (38a)$$

$$\nabla_d(CF)=2L\times E[(|\tilde{y}_n|^L-R^L)|\tilde{y}_n|^{L-2}\tilde{y}_n r_n]. \quad (38b)$$

Assuming a perfectly equalized channel, the following value for $R^L$ results:

$$R^L=\frac{E[a_n^{2L}]}{E[|a_n|^L]} \quad (39)$$

The best compromise between cost and performance is achieved with L=2, in which case the tap updating algorithms become $$c_{n+1}=c_n-\alpha(y_n^2-R^2)y_n r_n, \text{ and} \quad (40a)$$

$$d_{n+1}=d_n-\alpha(\tilde{y}_n^2-R^2)\tilde{y}_n r_n. \quad (40b)$$

Turning now to the cross-coupled FSLE structure illustrated by FIG. 4, the gradient of the cost function represented by equation (37) with respect to the complex tap vector $C_n$ is given by:

$$\nabla_C(CF)=2L\times E[K^*R_n], \quad (41)$$

where, $$K=[(|y_n|^L-R^L)|y_n|^{L-2}y_n]+j[(|\tilde{y}_n|^L-R^L)|y_n|^{L-2}\tilde{y}_n]. \quad (42)$$

Assuming a perfectly equalized channel, the value for $R^L$ is:

$$R^L=\frac{E[a_n^{2L}+b_n^{2L}]}{E[|a_n|^L+|b_n|^L]}, \quad (43)$$

which reduces to equation (39) for the usual case where the symbols $a_n$ and $b_n$ have the same statistics. For L=2, the tap updating algorithm for the complex tap vector $C_n$ becomes:

$$C_{n+1}=C_n-\alpha K^*R_n, \quad (44)$$

where, $$K=(y^2-R^2)y+j(\tilde{y}^2-R^2)\tilde{y}. \quad (45)$$

Turning now to the four-filter FSLE structure illustrated by FIG. 5, the gradients of the cost function represented by equation (37) with respect to the four tap vectors are similar to the ones given in equations (38a) and (38b). For L=2, the tap updating algorithms become:

$$c_{1,n+1}=c_{1,n}-\alpha(y_n^2-R^2)y_n r_n, \quad (46a)$$

$$d_{1,n+1}=d_{1,n}+\alpha(\tilde{y}_n^2-R^2)\tilde{y}_n r_n, \quad (46b)$$

$$c_{2,n+1}=c_{2,n}-\alpha(\tilde{y}_n^2-R^2)\tilde{y}_n\tilde{r}_n, \text{ and} \quad (46c)$$

$$d_{2,n+1}=d_{2,n}-\alpha(y_n^2-R^2)y_n\tilde{r}_n. \quad (46d)$$

The constant R is the same as in equation (39).

Figure 7:
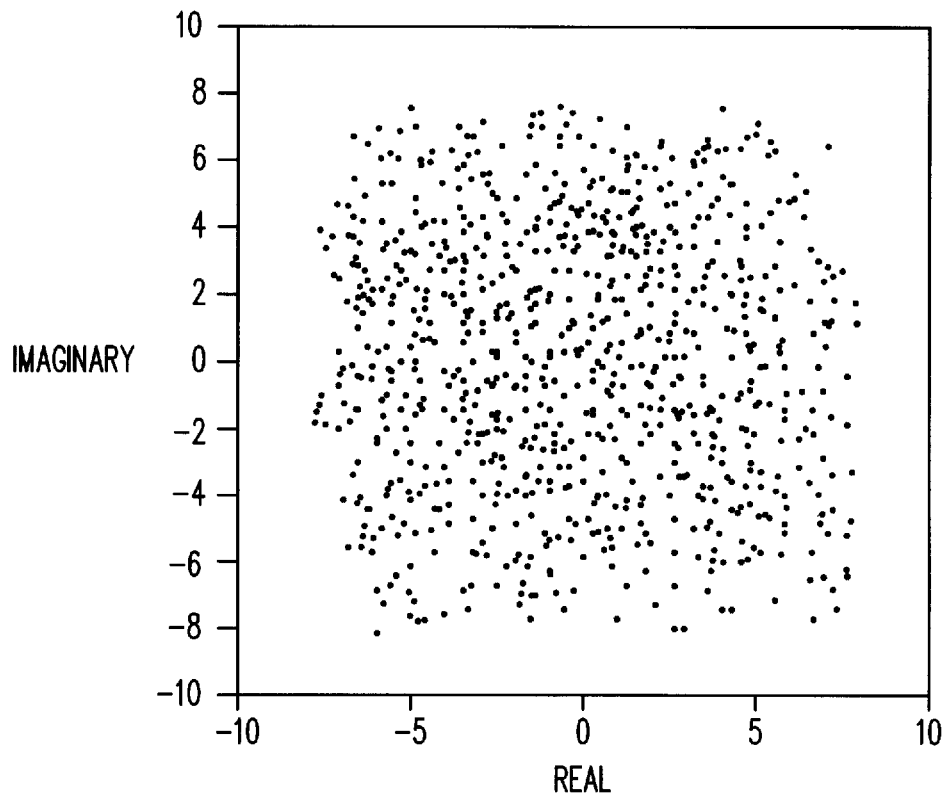
FIG. 7 is an illustrative signal point plot of an output signal of an equalizer for a system using the MMA blind equalization method.
Figure 16:
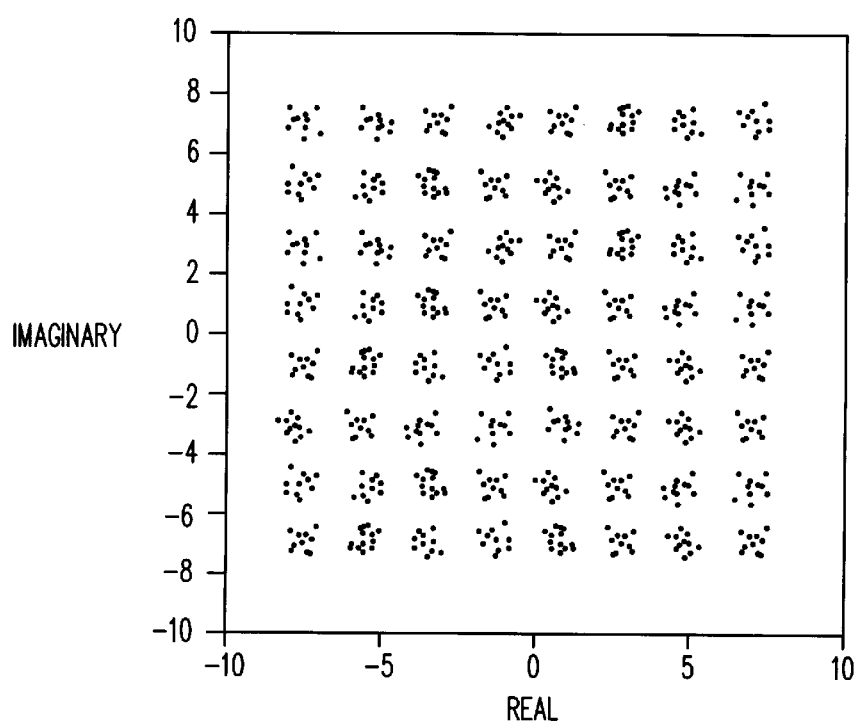
FIGS. 16 and 17 are illustrative signal point plots of an output signal of an equalizer for a communications system using a two-step MMA blind equalization method.

The above-mentioned two-step blind equalization procedure utilizing the MMA algorithm is graphically illustrated by FIGS. 6, 16, and 17 for equalizer 100. The output signal of equalizer 100, before any form of convergence, is shown in FIG. 6. As noted above, FIG. 6 represents experimental data obtained for a 64-CAP receiver using a phase-splitting FSLE as represented by FIG. 2. FIG. 7 illustrates the beginning of the MMA process convergence. As shown in FIG. 16, the MMA technique converges the equalizer enough to clearly illustrate the 64-symbol signal space as 64 noisy clusters. Although these noisy clusters would, typically, not be acceptable for steady-state operation—the eye is open enough to allow the receiver to switch to a 64-point slicer and a decision-directed LMS algorithm. The end result is a much cleaner constellation, as shown in FIG. 17. Typically, a clean transition can be made between the two modes of adaptation, MMA and decision directed, when the symbol error rate is better than $10^{-2}$, although successful transitions have been observed for worse symbol error rates. It should be pointed out that the noisy clusters in FIG. 16 could be further reduced by decreasing the step size in the MMA tap adjustment algorithm. Indeed, in some applications it may be possible to eliminate the switching to a decision directed tap adaptation algorithm. However, it should be noted that this would increase the start-up time and the required amount of digital precision.

The MMA algorithm for square constellations can be used without modification for nonsquare constellations. In this case, caution has to be exercised in the computation of the constant R, because the discrete levels for the symbols $a_n$ and $b_n$ do not all have the same probability of occurrence (described below). However, it has been found through computer simulations that convergence of the MMA algorithm is somewhat less reliable for nonsquare constellations than for square constellations. This can be corrected by using the modified MMA discussed in the following section.

Multimodulus Algorithm (MMA)—NonSquare Constellations

Figure 13:
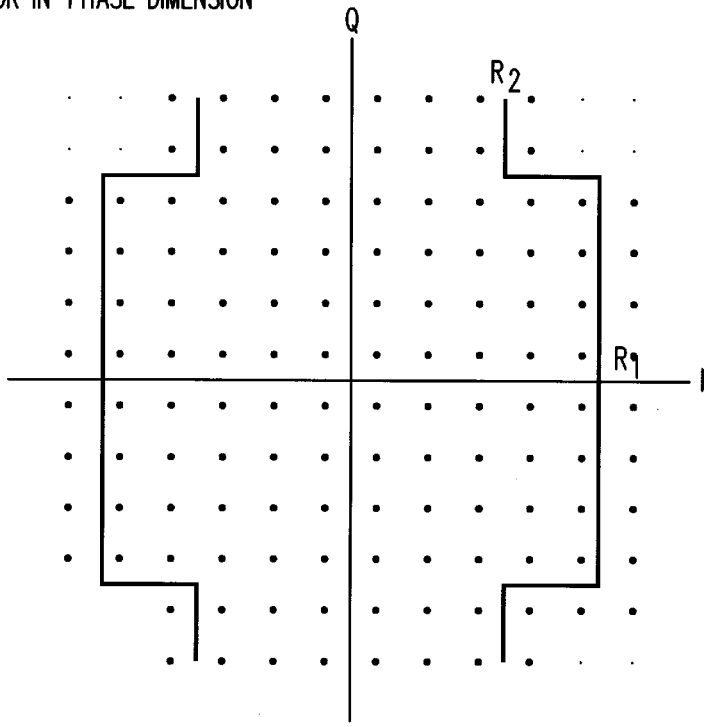
FIGS. 13, 14, and 15, are illustrative signal point plots illustrating the piecewise linear contours of the MMA blind equalization method for a nonsquare constellation.
Figure 14:
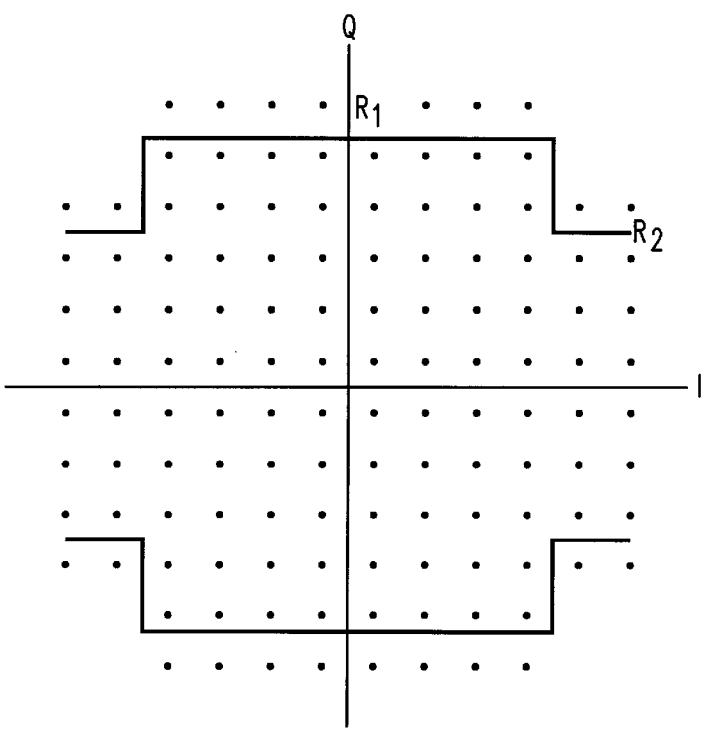
Figure 15:
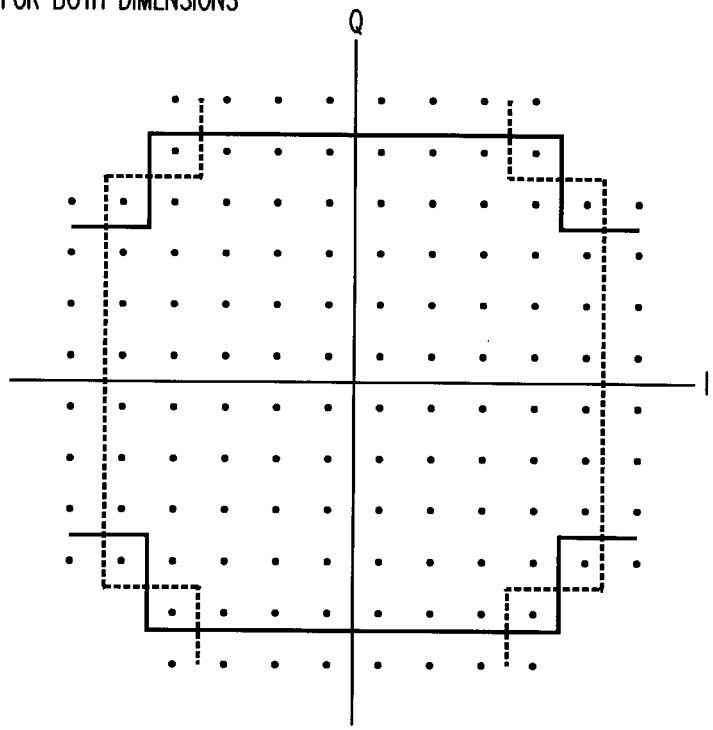

The principle of the modified MMA is illustrated in FIGS. 13, 14, and 15, with respect to a 128-CAP signal constellation. (A 128-point signal constellation is obtained in the following way. First define a 144-point signal constellation using the symbol levels $\pm 1, \pm 3, \pm 5, \pm 7, \pm 9, \pm 11$, and then remove the four corner points in each quadrant.) Minimization of the dispersion of the equalizer output samples $y_n$ and $\tilde{y}_n$ is now done around piecewise straight lines. Again, this is done independently for $y_n$ and $\tilde{y}_n$. The quadrature cost functions derived from equation (37) are:

$$CF_Q = E[(\tilde{y}_n^L - R_1^L)^2] \text{ if } |y_n| < K, \text{ and} \quad (47a)$$

$$CF_Q = E[(\tilde{y}_n^L - R_2^L)^2] \text{ if } |y_n| > K. \quad (47b)$$

The in-phase cost functions derived from equation (37) are:

$$CF_I = E[(y_n^L - R_1^L)^2] \text{ if } |\tilde{y}_n| < K, \text{ and} \quad (47c)$$

$$CF_I = E[(y_n^L - R_2^L)^2] \text{ if } |\tilde{y}_n| > K. \quad (47d)$$

The constant K is a function of the signal constellation under consideration and is determined empirically. In computer simulations for 128-CAP, a suggested value is K=8. Two different moduli $R_1$ and $R_2$ are used in equations (47) because the symbols $a_n$ and $b_n$ used in the 128-point constellation have two sets of levels $\{\pm 1, \pm 3, \pm 5, \pm 7\}$ and $\{\pm 9, \pm 11\}$ which have a different probability of occurrence. More moduli can be used if there are more than two sets of symbol levels with different statistics.

The moduli $R_1$ and $R_2$ in equations (47) are computed from equation (39) by evaluating the moments of the symbols over the set of symbol levels to which a given modulus applies (additionally described below). As an example, consider FIG. 13, which illustrates the moduli for the in-phase dimension and which applies to the real symbols $a_n$ of a 128-CAP signal constellation. The moments of the symbols can be computed by considering the first quadrant only. Consider the subset of 24 symbols in this quadrant that applies to $R_1$. For these symbols $a_n = 1, 3, 5, 7, 9, 11$; and $b_n = 1, 3, 5, 7$; so that each value of $a_n$ occurs with probability $4/24 = 1/6$. Similarly, the $R_2$ subset has 8 symbols for which $a_n = 1, 3, 5, 7$ and $b_n = 9, 11$, so that each value of $a_n$ occurs with probability $2/8 = 1/4$. Thus, the variance of the symbols becomes:

$$\text{for } R_1 \text{ symbols, } E[a_n^2] = \frac{1}{6}(1^2 + 3^2 + 5^2 + 7^2 + 9^2 + 11^2) \approx 47.67, \quad (48a)$$

and $$\text{for } R_2 \text{ symbols, } E[a_n^2] = \frac{1}{4}(1^2 + 3^2 + 5^2 + 7^2) = 21. \quad (48b)$$

Other moments of the symbols are computed in a similar fashion and then used in equation (39) to evaluate the values of the various moduli.

The tap updating algorithms for the modified MMA algorithm are the same as the ones given in equations (40), (44), and (46), except that the constant R is replaced by either $R_1$ or $R_2$ depending on which equalizer output sample $Y_n$ is received. FIG. 14 illustrates the Moduli for the quadrature dimension and which applies to the symbols $b_n$ of the 128-CAP signal constellation. It should be apparent from FIG. 15, which represents the union of FIGS. 13 and 14, that the in-phase and quadrature tap updating algorithms need not use the same moduli $R_1$ or $R_2$ in a given symbol period.

Moments of Data Symbols

The following description discusses the concept of "moments of data symbols." In particular, the closed-form expressions for the moments $E[|a_n|^L]$, $E[|b_n|^L]$, and $E[|A_n|^L]$ when the symbols $a_n$ and $b_n$ take values proportional to the odd integers $\pm 1, \pm 3, \pm 5, \pm 7, \ldots$, are presented. These expressions are then used to get closed-form expressions for the constants R used in the three blind equalization algorithms and illustrated in the table of FIG. 19 (described below).

First, it is assumed that the symbols $a_n$ and $b_n$ have the same statistics, so that $E[a_n^L] = E[b_n^L]$. Consider first the following known summations of powers of integers:

$$\sum_{k=1}^{m} k = \frac{1}{2} m(m+1), \quad (49a)$$

$$\sum_{k=1}^{m} k^2 = \frac{1}{6} m(m+1)(2m+1), \quad (49b)$$

$$\sum_{k=1}^{m} k^3 = \frac{1}{4} [m(m+1)]^2, \quad (49c)$$

and $$\sum_{k=1}^{m} k^4 = \frac{1}{30} m(m+1)(2m+1)(3m^2 + 3m - 1). \quad (49d)$$

These summations can be used to find closed-form expressions for sums of powers of odd integers. For example, for power one:

$$(1 + 3 + 5 + 7) = (1 + 2 + 3 + 4 + 5 + 6 + 7) - 2(1 + 2 + 3) \quad (50)$$

$$\rightarrow \sum_{k=1}^{m}(2k-1) = \sum_{k=1}^{2m-1} k - 2 \sum_{k=1}^{m-1} k = m^2,$$

where the two summations in the middle have been evaluated by using the closed-form expression of equation (49a). Similar series manipulations can be used for other sums of powers of odd integers.

Now, consider square signal constellations which use symbols $a_n$ and $b_n$ with values $\pm 1, \pm 3, \pm 5, \pm 7, \ldots \pm(2m-1)$, where m is the number of different symbol levels (in magnitude). As an example, for the 4-CAP, 16-CAP, 64-CAP, and 256-CAP square signal constellations, m=1, 2, 4, and 8, respectively. It is also assumed that all the symbol values are equiprobable. As a result, the moments of the symbols $a_n$ are:

$$E[|a_n|] = \frac{1}{m} \cdot \sum_{k=1}^{m} (2k-1) = m, \tag{51}$$

$$E[a_n^2] = \frac{1}{m} \cdot \sum_{k=1}^{m} (2k-1)^2 = \frac{1}{3}(4m^2-1), \tag{52}$$

$$E[|a_n|^3] = \frac{1}{m} \cdot \sum_{k=1}^{m} (2k-1)^3 = m(2m^2-1), \tag{53}$$

and $$E[a_n^4] = \frac{1}{m} \cdot \sum_{k=1}^{m} (2k-1)^4 = \frac{1}{15}(4m^2-1)(12m^2-7). \tag{54}$$

Next, consider the complex symbols $A_n = a_n + jb_n$. Assuming that the symbols $a_n$ and $b_n$ are uncorrelated, the following expressions for the even moments of the complex symbols result:

$$E[|A_n|^2] = 2E[a_n^2], \text{ and} \tag{55a}$$

$$E[|A_n|^4] = 2E[a_n^4] + 2[E|a_n^2|]^2. \tag{55b}$$

Using equations (52) and (54) in equation (55b), results in:

$$E[|A_n|^4] = \frac{4}{45}(4m^2-1)(28m^2-13) \tag{56}$$

The above results can now be used to get closed-form expressions for the constants R used in the various blind equalization algorithms. The following (remarkably simple) expressions for these constants result:

$$R_{rca}\frac{E[a_n^2]}{E[|a_n|]} = \frac{4m^2-1}{3m}, \tag{57}$$

$$R_{mma}^2 \frac{E[a_n^4]}{E[a_n^2]} = \frac{12m^2-7}{5}, \tag{58}$$

and $$R_{mma}^2 \frac{E[|A_n|^4]}{E[|A_n|^2]} = \frac{56m^2-26}{15}. \tag{59}$$

With respect to nonsquare signal constellations, the various symbol levels $2k-1$ for $a_n$ and $b_n$ have a different probability of occurrence, even when all the complex symbols $A_n$ are equiprobable. This should be apparent from the 128-point constellation illustrated by FIG. 15. In this case, the moments of the symbols have to be computed according to the general formula:

$$E[|a_n|^L] = \tag{60}$$

$$P_1 \sum_{k=1}^{m_1}(2k-1)^L + P_2 \sum_{m_1+1}^{m_2}(2k-1)^L + P_3 \sum_{m_2+1}^{m_3}(2k-1)^L + \ldots$$

where $P_i$ is the probability of occurrence of the symbol levels appearing in the corresponding summation. For typical 32-CAP and 128-CAP constellations the expression in (60) is restricted to two different probabilities $P_1$ and $P_2$.

Everything else being equal (i.e., symbol rate, shaping filters, etc.), it is possible to guarantee a constant average power at the output of a CAP transmitter if $E[a_n^2] = E[b_n^2]$ = constant, independently of the type of signal constellation that is used. Of course, different signal constellations will have to use different symbol values if the average power constraint has to be satisfied. Thus, in general, a signal constellation will use symbol values $\lambda(2k-1)$ where $\lambda$ is chosen in such a way that the average power constraint is satisfied. For simplicity, it is assumed that $E[a_n^2]=1$. For square constellations, the value of $\lambda$ can then be determined from equation (52), to result in:

$$E[a_n^2] = \frac{1}{m} \sum_{k=1}^{m}[\lambda(2k-1)]^2 = \frac{\lambda^2(4m^2-1)}{3} = 1 \rightarrow \lambda^2 = \frac{3}{4m^2-1} \tag{61}$$

Using this expression of $\lambda$ in equations (57), (58), and (59), the following expressions for the normalized constants R result:

$$\overline{R}_{rca} = \lambda \frac{E[a_n^2]}{E[|a_n|]} = \frac{\sqrt{4m^2-1}}{m\sqrt{3}}, \tag{62}$$

$$\overline{R}_{mma}^2 = \lambda^2 \frac{E[a_n^4]}{E[a_n^2]} = \frac{3}{5} \frac{12m^2-7}{4m^2-1}, \tag{63}$$

and $$\overline{R}_{cma}^2 = \lambda^2 \frac{E[|A_n|^4]}{E[|A_n|^2]} = \frac{1}{5} \frac{56m^2-26}{4m^2-1}. \tag{64}$$

Similar expressions can be obtained for nonsquare constellations in a similar fashion. When the number of points in the signal constellation becomes very large, the following asymptotic values for the normalized constants result:

$$m \rightarrow \infty \overline{R}_{rca} \approx 1.155 \overline{R}_{mma} \approx 1.342 \overline{R}_{cma} \approx 1.673. \tag{65}$$

Summary of RCA, CMA, and MMA Algorithms

A general comparison of the RCA, CMA, and MMA techniques is shown in the table of FIG. 18. In addition, the table shown in FIG. 19 shows illustrative values, for signal constellations of different sizes, of the constants R, $R_1$, and $R_2$, which are used in the tap updating algorithms of the RCA, CMA, and MMA, blind equalization techniques described above. The data shown in FIG. 19 assumes that the symbols $a_n$ and $b_n$ take the discrete values $+1, \pm 3, \pm 5, \pm 7, \ldots$. The closed-form expressions for these constants are derived as described above.

In comparison to the RCA and CMA, the MMA algorithm has a number of advantages. With respect to the RCA algorithm, the MMA algorithm converges faster and is more reliable. With respect to the CMA algorithm, the MMA algorithm is less costly to implement since less processing is required to perform the convergence. Also, MMA does not additionally phase rotate the signal points so that a compensating phase rotator is not required as in the CMA approach. It should also be noted that the MMA algorithm is especially attractive for carrierless AM/PM digital transmission systems, and can also be used for other modulation schemes such as quadrature amplitude modulation.

Unfortunately, as noted earlier, the RCA, CMA, and MMA, can, to varying degrees, converge to the wrong solution under certain conditions, e.g., the above-mentioned "diagonal solution." However, we have realized a technique that provides reliable blind convergence of an equalizer for a two-filter structure. In particular, the cost function of a blind equalization algorithm is designed in such a way that the two filters are constrained to be a Hilbert pair. In other words, proper system convergence can only be achieved if the properties of Hilbert transforms are satisfied by the two filters. For example, one of these properties is that the two filters have to be orthogonal to each other. As used herein, this new blind equalization cost function is called the "constrained Hilbert cost function" (CHCF). Advantageously, this technique can be used with any blind equalization algorithms, such as RCA, CMA, and MMA. It should be noted that with CMA, the error correction term is a combination of the two channels, which minimizes the opportunity to create wrong solutions. As a result, the CHCF algorithm is mostly useful for the RCA and MMA approaches and only illustrative embodiments of these approaches are described below.

Constrained Hilbert Cost Function (CHCF)

Figure 11:
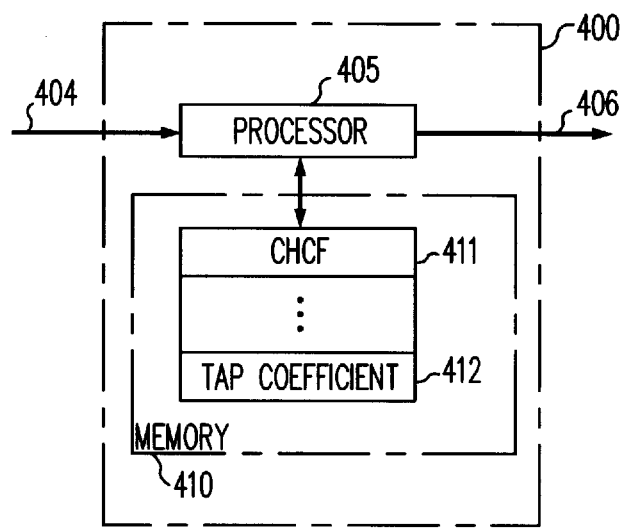
FIGS. 11 and 12 are illustrative block diagrams of a portion of a receiver embodying the principles of the invention.
Figure 12:
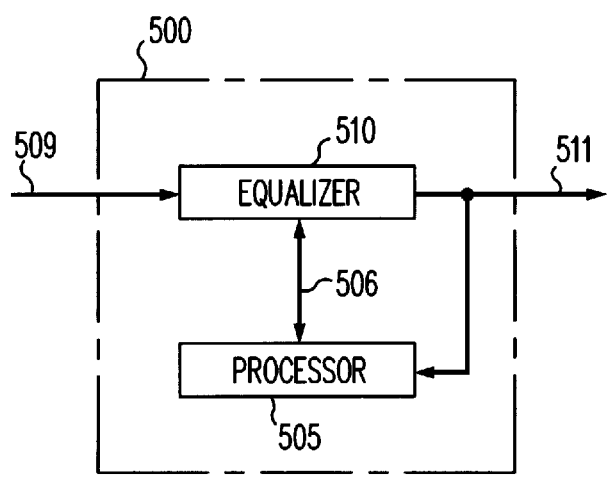

Illustrative embodiments of the inventive concept are shown in FIGS. 11 and 12. FIG. 11 illustrates an embodiment representative of a digital signal processor 400 that is programmed to implement an FSLE in accordance with the principles of the invention. Digital signal processor 400 comprises a central processing unit (processor) 405 and memory 410. A portion of memory 410 is used to store program instructions that, when executed by processor 405, implement the CHCF algorithm. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide an output signal 406. For the purposes of example only, it is assumed that output signal 406 represents a sequence of output samples of an equalizer. (As known in the art, a digital signal processor may, additionally, further process received signal 404 before deriving output signal 406.) An illustrative software program is not described herein since, after learning of the CHCF algorithm as described herein, such a program is within the capability of one skilled in the art. Also, it should be noted that any equalizer structures, such as those described earlier, can be implemented by digital signal processor 400 in accordance with the inventive concept.

FIG. 12 illustrates another alternative embodiment of the inventive concept. Circuitry 500 comprises a central processing unit (processor) 505, and an equalizer 510. The latter is illustratively assumed to be a phase-splitting FSLE as described above. It is assumed that equalizer 510 includes at least one tap-coefficient register for storing values for corresponding tap coefficient vectors (e.g., as shown in FIG. 3). Processor 505 includes memory, not shown, similar to memory 410 of FIG. 11 for implementing the CHCF algorithm. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution.

Constrained Hilbert Cost Function (CHCF) Applied to RCA

The new cost function for the two-filter structure using RCA is designed first, and the corresponding tap updating algorithm is then derived. The two-filter structure shown in FIG. 2, has two real filters c and d, whose RCA tap updating algorithms are illustrated by equations (24a) and (24b). In its general form, the RCA cost function is designed to minimize the mean-squared error at the 4-point slicer.

It should be noted from equations (24a) and (24b) that the two filters are updated independently. Although the cost function is designed to minimize the resultant error $E_{r,n}$, the errors can be computed independently along the in-phase and quadrature phase dimensions. The cost function can then be interpreted as two separate ones:

$$CF = E[e_{r,n}^2 + \tilde{e}_{r,n}^2] = E[e_{r,n}^2] + E[\tilde{e}_{r,n}^2]. \tag{66}$$

For RCA, the error terms are computed as shown in equations (21a) and (21b), where R is a properly chosen constant. From these equations, it can be observed that each error term is computed independently of the other one. As such, even though the two filters may converge and properly equalize the channel, proper system convergence may not be achieved if the two filters are independently adapted without any constraint. For instance, the above-mentioned diagonal solution can be created even with perfect convergence for each filter. In order to reduce the occurrence of wrong solutions and increase the reliability of convergence, it is necessary to modify the fundamental cost function so that coupling can be introduced between the two channels.

Specifically, to force the two filters to be a Hilbert pair in the transceiver system, the constrained Hilbert cost function (CHCF) is proposed. In addition to the error at the slicer, and in accordance with the inventive concept, two new error quantities are used to update the filters according to this new cost function.

One condition for a Hilbert pair is that the impulse response of the two filters have to be orthogonal to each other. Therefore the first error quantity, $e_{o,n}$, introduced in the cost function is derived from this orthogonality condition and is referred to herein as the "orthogonality error." The orthogonality error is computed by the dot product before the taps are updated with slicer error $e_{r,n}$:

$$e_{o,n} = c_n^T d_n \tag{67}$$

For a perfect Hilbert pair, $e_{o,n}=0$. However, the two filters can be orthogonal but may not necessarily be a Hilbert pair if they only satisfy the dot product condition. So a second error quantity $e_{h,n}$ is added in the cost function to satisfy another necessary condition for Hilbert transforms, which is the equal energy condition:

$$e_{h,n} = c_n^T c_n - d_n^T d_n, \tag{68}$$

and $e_{h,n}=0$ for Hilbert transforms. The equal energy property of the Hilbert transform is stated as:

$$\int_{-\infty}^{+\infty} c^2(t)dt = \int_{-\infty}^{+\infty} \tilde{c}^2(t)dt \rightarrow c_n^T c_n = d_n^T d_n \tag{69}$$

With the two error quantities in Equations (67) and (68), the complete constrained Hilbert cost function in the mean-squared error sense becomes $$CF = E[e_{r,n}^2 + \tilde{e}_{r,n}^2 + e_{o,n}^2 + e_{h,n}^2] \tag{70}$$

The cost function can be further expressed as:

$$CF = E[e_{r,n}^2 + \tilde{e}_{r,n}^2 + e_{o,n}^2 + e_{h,n}^2] \tag{71a}$$

$$= E[(y_n - Rsgn(y_n))^2 + (\tilde{y}_n - Rsgn(\tilde{y}_n))^2 + (c_n^T d_n)^2 + \tag{71b}$$

$$(c_n^T c_n - d_n^T d_n)^2]$$

$$\tag{71c}$$
$$= E[(c_n^T r_n - \tilde{a}_n)^2 + (d_n^T r_n - \tilde{b}_n)^2 + (c_n^T d_n)^2 + (c_n^T c_n - d_n^T d_n)^2]$$

Figure 21:
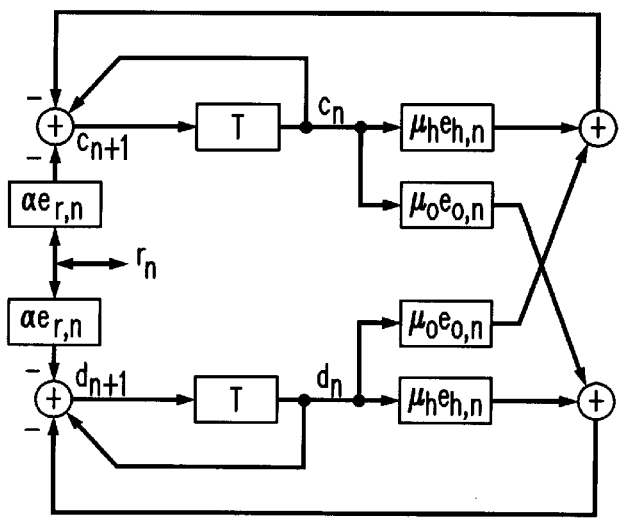
FIG. 21 shows a block diagram of a two-filter structure incorporating the CHCF algorithm for use in an RCA approach.

Tap updating of the two-filter structure with CHCF is graphically illustrated in FIG. 21. In each channel, three error correction terms are summed up to form the total correction term. The gradients of the constrained Hilbert cost function with respect to the two tap vectors are derives as $$\nabla_c(CF) = \frac{\partial CF}{\partial c_n} = E[e_{r,n}r_n + e_{o,n}d_n + e_{h,n}c_n] \quad (72)$$

$$\nabla_d(CF) = \frac{\partial CF}{\partial d_n} = E[\tilde{e}_{r,n}r_n + e_{o,n}c_n - e_{h,n}d_n] \quad (73)$$

The filter's taps are updated in the opposite direction of the gradients, so that the stochastic gradient algorithm for updating the taps are obtained as $$c_{n+1} = c_n - \alpha e_{r,n}r_n - \mu_o e_{o,n}d_n - \mu_h e_{h,n}c_n \quad (74)$$

$$d_{n+1} = d_n - \alpha \tilde{e}_{r,n}r_n - \mu_o e_{o,n}c_n + \mu_h e_{h,n}d_n \quad (75)$$

Here three different step sizes are used for the three error correction terms: $\alpha$, $\mu_o$, and $\mu_h$. The tap updating algorithms can be further expressed as functions of the input vectors:

$$c_{n+1} = c_n - \alpha(c_n^T r_n - \hat{a}_n)r_n - \mu_o(c_n^T d_n)d_n - \mu_h(c_n^T c_n - d_n^T d_n)c_n \quad (76)$$

$$d_{n+1} = d_n - \alpha(d_n^T r_n - \hat{b}_n)r_n - \mu_o(c_n^T d_n)c_n - \mu_h(c_n^T c_n - d_n^T d_n)d_n \quad (77)$$

In accordance with the inventive concept, the blind equalization algorithm provided above for the two-filter structure is used to open the eye diagram by using the constrained Hilbert cost function with its corresponding tap updating algorithms. The algorithm then switches to operate with the standard LMS tap updating algorithm when the eye pattern has been opened enough by the blind equalization algorithm. It should be noted that the terms $(c_n - \alpha(c_n^T r_n - \hat{a}_n)r_n)$ and $(d_n - \alpha(d_n^T r_n - \hat{b}_n)r_n)$ from equations (76) and (77), respectively, are the tap updating equations of the unmodified RCA approach described earlier.

As noted above, three step sizes are involved in this new algorithm. Appropriate step sizes need to be chosen empirically so that the equalizers behave properly during channel equalization. Typically, for RCA we chose $\mu_o = 2\alpha$, and $\mu_h = 0.5\alpha$.

Constrained Hilbert Cost Function (CHCF) Applied to MMA

The modified blind equalization algorithm for RCA discussed in the previous section reduces the occurrence of the two wrong solutions during blind start-up. The same convergence problem can also occur occasionally for MMA although less frequently. The general form of the cost function for MMA is shown in equation (36). The gradients of this cost function are shown in equations (38a) and (38b). For the purposes of this example, it is assumed that the MMA tap updating algorithms are represented by equations (40a) and (40b).

The cost function of MMA was originally designed in such a way that two filter errors would be independently minimized. As was the case for RCA, the two-filter equalizer may converge to some wrong solutions if the two filters are adapted independently without any constraint between them. In modifying the MMA algorithm to incorporate the CHCF approach, the constrained Hilbert cost function can use the same form as given in equation (66). Using the normal MMA correction terms $e_{r,n}$, and $\tilde{e}_{r,n}$, the new cost function for MMA is expressed as:

$$CF = E[e_{r,n}^2 + \tilde{e}_{r,n}^2 + e_{o,n}^2 + e_{h,n}^2] \quad (78a)$$

$$= E[(y_n^2 - R^2)^2 + (\tilde{y}_n^2 - R^2)^2 + (c_n^T d_n)^2 + (c_n^T c_n - d_n^T d_n)^2] \quad (78b)$$

$$= E[(c_n^T r_n r_n^T c_n - R^2)^2 + (d_n^T r_n d_n^T r_n - R^2)^2 + (c_n^T d_n)^2 + (c_n^T c_n - d_n^T d_n)^2] \quad (78c)$$

The gradients of this constrained Hilbert cost function with respect to the tap vectors are derived as:

$$\nabla_c(CF) = E[e_{x,n}y_u r_n + e_{o,n}d_n + e_{h,n}c_n] \quad (79a)$$

$$\nabla_d(CF) = E[e_{r,n}y_n r_n + e_{o,n}c_n + e_{h,n}d_n] \quad (79b)$$

The tap updating algorithms for the two filters are provided by the following equations $$c_{n+1} = c_n - \alpha(c_n^T r_n)^2 - R^2)y_n r_n - \mu_o(c_n^T d_n)d_n - \mu_h(c_n^T c_n - d_n^T d_n)c_n^T \quad (80)$$

$$d_{n+1} = d_n - \alpha(d_n^T r_n)^2 - R^2)\tilde{y}_n r_n - \mu_o(c_n^T d_n)c_n + \mu_h(c_n^T c_n - d_n^T d_n)d_n^T \quad (80)$$

It is observed that for MMA, only the basic error correction terms, $e_{r,n}$ and $\tilde{e}_{r,n}$, are different from that of RCA, and the error correction terms $e_{o,n}$ and $e_{h,n}$ are computed in the same fashion as for RCA.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an equalizer, etc., the functions of any one or more of those building blocks can be carried out using one or more appropriate programmed processors.

In addition, although the inventive concept was described in the context of an two-filter FSLE, the inventive concept is applicable to other forms of adaptive filters, such as, but not limited to, a decision feedback equalizer (DFE). The inventive concept is applicable to all forms of communications systems, e.g., broadcast networks, e.g., high-definition television (HDTV), point-to-multipoint networks like fiber to the curb (mentioned above), signal identification or classification applications like wire-tapping, etc.

What is claimed:

1. An improved equalizer for use in a receiver for performing blind equalization; the improvement comprising:
    a processor that adapts coefficients of the equalizer using a blind equalization algorithm modified to include a constrained Hilbert cost function.

2. The improvement of claim 1 wherein the processor is a digital signal processor.

3. The improvement of claim 1 wherein the blind equalization algorithm is a reduced constellation algorithm modified to include an orthogonal error term and an equal energy condition.

4. The improvement of claim 1 wherein the blind equalization algorithm conforms to a constant modulus algorithm modified to include an orthogonal error term and an equal energy condition.

5. The apparatus of claim 1 wherein the blind equalization algorithm conforms to a multimodulus algorithm modified to include an orthogonal error term and an equal energy condition.

6. Apparatus for use in a receiver, the apparatus comprising:
    an equalizer having a set of tap coefficient values and for providing an equalized version of an applied input signal; and a processor for adapting the set of tap coefficients as a function of a blind equalization algorithm that incorporates a constrained Hilbert cost function.

7. The apparatus of claim 6 wherein the blind equalization algorithm is a reduced constellation algorithm modified to include an orthogonal error term and an equal energy condition.

8. The apparatus of claim 6 wherein the blind equalization algorithm conforms to a constant modulus algorithm modified to include an orthogonal error term and an equal energy condition.

9. The apparatus of claim 6 wherein the blind equalization algorithm conforms to a multimodulus algorithm modified to include an orthogonal error term and an equal energy condition.

10. An improved equalizer for use in a receiver for performing blind equalization; the improvement comprising:
    a processor a) for providing an equalizer function for equalizing a received signal, and b) for adapting coefficients of the equalizer function by using a blind equalization algorithm modified to include a constrained Hilbert cost function.

11. The apparatus of claim 10 wherein the processor is a digital signal processor.

12. The apparatus of claim 10 wherein the blind equalization algorithm is a reduced constellation algorithm modified to include an orthogonal error term and an equal energy condition.

13. The apparatus of claim 10 wherein the blind equalization algorithm conforms to a constant modulus algorithm modified to include an orthogonal error term and an equal energy condition.

14. The apparatus of claim 10 wherein the blind equalization algorithm conforms to a multimodulus algorithm modified to include an orthogonal error term and an equal energy condition.

15. A method for use in a communications receiver, the method comprising the steps of:
    adaptively filtering a received signal as a function of a set of tap coefficient values to provide a filtered signal; and
    using a blind equalization algorithm to adapt the set of tap coefficient values;
    wherein the blind equalization algorithm is a function of a constrained Hilbert cost function.

16. The method of claim 15 wherein the blind equalization algorithm conforms to a reduced constellation algorithm modified to include an orthogonal error term and an equal energy condition.

17. The method of claim 15 wherein the blind equalization algorithm conforms to a constant modulus algorithm modified to include an orthogonal error term and an equal energy condition.

18. The method of claim 15 wherein the blind equalization algorithm conforms to a multimodulus algorithm modified to include an orthogonal error term and an equal energy condition.

19. The method of claim 15 further comprising the step of switching to an unconstrained decision directed adaptation algorithm for adjusting the set of tap coefficient values when a calculated error rate is less than a predetermined value.

20. The method of claim 19 wherein the unconstrained decision directed adaptation algorithm uses a least means squared tap updating algorithm.

21. Apparatus for use in performing blind equalization in a receiver, the apparatus comprising:
    a memory for storing a blind equalization algorithm that incorporates a constrained Hilbert cost function and for storing a set of tap coefficient values; and
    a processor a) for filtering an input signal as a function of the set of stored tap coefficient values to provide an output signal, and b) for executing the blind equalization algorithm to adapt the set of stored tap coefficient values.

22. The apparatus of claim 21 wherein the blind equalization algorithm is a reduced constellation algorithm modified to include an orthogonal error term and an equal energy condition.

23. The apparatus of claim 21 wherein the blind equalization algorithm conforms to a constant modulus algorithm modified to include an orthogonal error term and an equal energy condition.

24. The apparatus of claim 21 wherein the blind equalization algorithm conforms to a multimodulus algorithm modified to include an orthogonal error term and an equal energy condition.

25. An improved adaptive filter for performing blind equalization in a receiver, the improvement comprising:
    an adaptive filter having a two-filter structure, where each of the two filters further comprises a respective set of tap coefficient values, and wherein a blind equalization algorithm adapts each set of tap coefficient values for each filter as a function of an orthogonal error term and an equal energy condition.

26. The improvement of claim 25 wherein the blind equalization algorithm is a modified reduced constellation algorithm.

27. The improvement of claim 25 wherein the blind equalization algorithm conforms to a constant modulus algorithm.

28. The improvement of claim 25 wherein the blind equalization algorithm conforms to a multimodulus algorithm.

29. Apparatus for use in a receiver, the apparatus comprising:
    an adaptive filter having a two-filter structure, where each of the two filters further comprises a respective set of tap coefficient values; and
    circuitry for adapting each set of tap coefficient values in accordance with a blind equalization algorithm that adapts each set of tap coefficient values for each filter as a function of an orthogonal error term and an equal energy condition.

30. The apparatus of claim 29 wherein the blind equalization algorithm is a modified reduced constellation algorithm.

31. The apparatus of claim 29 wherein the blind equalization algorithm conforms to a constant modulus algorithm.

32. The apparatus of claim 29 wherein the blind equalization algorithm conforms to a multimodulus algorithm.

33. A method for use in a communications receiver, the method comprising the steps of:
    using a two-filter structure for adaptively filtering a received signal, the two filter structure including a corresponding set of tap coefficient values for each filter; and
    using a blind equalization algorithm to adapt each set of tap coefficient values for each filter as a function of an orthogonal error term and an equal energy condition.

34. The method of claim 33 wherein the blind equalization algorithm otherwise conforms to a reduced constellation algorithm.

35. The method of claim 33 wherein the blind equalization algorithm otherwise conforms to a constant modulus algorithm.

36. The method of claim 33 wherein the blind equalization algorithm otherwise conforms to a multimodulus algorithm.

37. The method of claim 33 wherein the two-filter structure is a fractionally-spaced linear equalizer.

38. The method of claim 33 further comprising the step of switching to an unconstrained decision directed adaptation algorithm for adjusting the set of tap coefficient values when a calculated error rate is less than a predetermined value.

39. The method of claim 38 wherein the unconstrained decision directed adaptation algorithm uses a least means squared tap updating algorithm.

* * * * *